(12) United States Patent
Henry et al.

(10) Patent No.: US 12,081,988 B2
(45) Date of Patent: Sep. 3, 2024

(54) AUTHENTICATION SERVICE WITH ADDRESS ROTATION SUPPORT

(71) Applicant: Cisco Technology, Inc., San Jose, CA (US)

(72) Inventors: Jerome Henry, Pittsboro, NC (US); Nancy Cam-Winget, Mountain View, CA (US); Robert E. Barton, Richmond (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 282 days.

(21) Appl. No.: 17/355,700

(22) Filed: Jun. 23, 2021

(65) Prior Publication Data

US 2022/0417755 A1 Dec. 29, 2022

(51) Int. Cl.
*H04W 12/45* (2021.01)
*H04L 9/40* (2022.01)
*H04W 12/06* (2021.01)

(52) U.S. Cl.
CPC ......... *H04W 12/45* (2021.01); *H04L 63/0876* (2013.01); *H04L 63/1466* (2013.01); *H04L 63/1483* (2013.01); *H04W 12/06* (2013.01)

(58) Field of Classification Search
CPC . H04L 63/08; H04L 63/0892; H04L 63/0876; H04L 2209/80; H04L 2101/622; H04L 63/102; H04L 63/0428; H04L 9/3271; H04L 63/10; H04L 63/162; H04L 61/503; H04L 2463/061; H04L 67/01; H04L 67/104; H04L 9/0819; H04L 9/14; H04L 9/3218; H04L 47/10; H04L 61/5014; H04L 63/0823; H04L 63/0869; H04L 9/0844; H04L 63/0272; H04L 63/0815; H04L 65/1016; H04L 65/80; H04L 67/61; H04L 67/62; H04L 9/32; H04L 2209/805; H04L 61/5007; H04W 84/12; H04W 12/06; H04W 12/069; H04W 12/08;
(Continued)

(56) References Cited

U.S. PATENT DOCUMENTS 9,398,010 B1  7/2016 Chickering et al.
2013/0097674 A1  4/2013 Jindal et al.
(Continued)

OTHER PUBLICATIONS

Ansley, et al., "Proposed Text for ID Query Action Frame," IEEE P802.11, Wireless LANs, 11-19-0496-01-000m11-19-0496-01-000m, https://mentor.ieee.org/802.11/dcn/19/11-19-0496-01-000m-id-query-proposal.docx, Jul. 2019, 4 pages.

*Primary Examiner* — Golam Sorowar
(74) *Attorney, Agent, or Firm* — Edell, Shapiro & Finnan, LLC

(57) ABSTRACT

To improve adaptation of network infrastructure to address rotations performed by wireless client device, embodiments provide for an exchange of a stable machine identifier (SMI) between a network access device and an authentication service. Some embodiments define a new SMI attribute that is included in a authentication service access-request and/or access-accept message. When a network access device obtains an SMI for a particular wireless client device, the network access device passes the SMI to the authentication service. Similarly, if an authentication service obtains a SMI value for a wireless client device, this information is provided to a network access device.

20 Claims, 13 Drawing Sheets

(58) Field of Classification Search
CPC ........... H04W 12/0431; H04W 12/062; H04W 12/04; H04W 80/04; H04W 36/08; H04W 36/14; H04W 12/02; H04W 12/041; H04W 12/72; H04W 88/06; H04W 88/16; H04W 92/02; H04W 8/26; H04W 36/0072; H04W 36/0077; H04W 8/205; H04W 80/00; H04W 12/068; H04W 12/71; H04W 12/73; H04W 74/00; H04W 36/0011; H04W 8/087; H04W 12/03; H04W 12/043; H04W 12/082

See application file for complete search history.

(56) References Cited

U.S. PATENT DOCUMENTS

| | | | |
|---|---|---|---|
| 2015/0163056 A1* | 6/2015 | Nix | H04W 12/35 380/46 |
| 2017/0099645 A1 | 4/2017 | Lindheimer et al. | |
| 2017/0118638 A1* | 4/2017 | Zhang | H04W 12/068 |
| 2017/0245143 A1 | 8/2017 | Lindheimer et al. | |
| 2019/0075114 A1 | 3/2019 | Pugaczewski et al. | |
| 2020/0244655 A1* | 7/2020 | Gundavelli | H04L 63/0876 |
| 2020/0275272 A1* | 8/2020 | Montemurro | H04W 12/72 |
| 2020/0351648 A1* | 11/2020 | Fang | H04W 12/03 |
| 2022/0029976 A1* | 1/2022 | Ericksen | H04W 12/63 |

* cited by examiner

AUTHENTICATION SERVICE WITH ADDRESS ROTATION SUPPORT

TECHNICAL FIELD

The present disclosure relates to secure networking.

BACKGROUND

In an effort to improve privacy of users of network devices, many operating system vendors are periodically changing (or "rotating") a device address (e.g. a station address) used to identify a device on a network. By changing the device address, it can be more difficult for an eavesdropper to track a location of a device user, but also, in some circumstances, more difficult to monitor their online activities. While rotation of a device address can improve privacy, much of the legacy network infrastructure was not designed to accommodate such address rotation, and in many cases, uses the device address as an identifier of the device for a variety of processing.

DESCRIPTION OF EXAMPLE EMBODIMENTS

Overview

Figure 1:
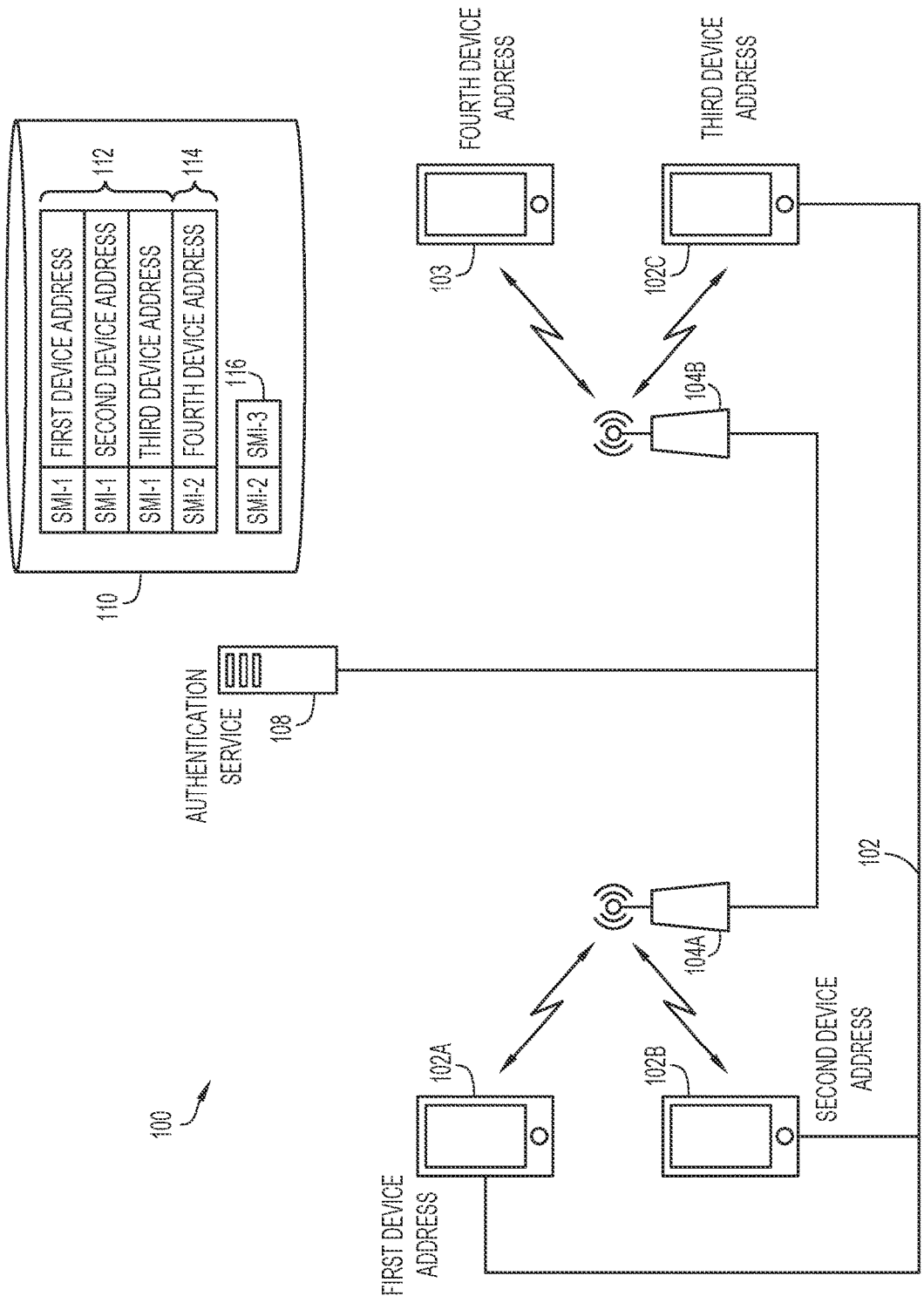
FIG. 1 is an overview diagram of a network implementing address rotation according to an example embodiment.

Aspects disclosed herein provide for methods of exchanging a stable machine identifier (SMI) between two or more of a wireless client device, network access device (NAD), or an authentication service. In one aspect, a method includes receiving, by a NAD, a first network message from a wireless client device, the first network message identifying the wireless client device via a first source device address, obtaining, by the NAD, a first SMI of the wireless client device, and transmitting, to the authentication service, a mapping of the first source device address to the first SMI.

Example Embodiments

The present disclosure is generally directed to embodiments that augment authentication server functionality to provide support for randomized and changing device addresses (RCM. Some of these embodiments augment request for comments (RFC) 2865 to provide these capabilities. With the increasing prevalence of RCM in wireless network environments, clients of wireless technologies (e.g., wireless stations (STAs), including those conforming to the Institute of Electrical and Electronics Engineers (IEEE) 802.11 or IEEE 802.15) use a variable device address when connecting to a network. In some cases, these wireless client devices exchange information with network infrastructure that uniquely identities the wireless client device (e.g. a Stable Machine Identifier (SMI)). This exchange of information typically occurs over a secure connection and/or within a protected frame, thus making the information exchange secure from eavesdroppers.

When using 802.1X Extensible Authentication Protocol (EAP), the client may also express to the authentication service a stable identity that can uniquely be associated to an SMI of the wireless client device. As wireless client device address rotates, there was previously no mechanism for the wireless infrastructure and a remote authentication dial-in user service (RADIUS) server to exchange information about this stable identifier. Additionally, RADIUS (e.g. per RFC 2865) defines multiple attributes, but none are tailored to share the stable identifier. Note that in some embodiments, the Calling-Station-Identifier (Calling-Station-ID) is a media access control (MAC) station address, and not the stable identifier. For example, the User-Name attribute could carry a SMI value, but RADIUS does not allow the wireless infrastructure to overwrite a user-name attribute when relaying this information from the wireless client device to the RADIUS server. The same difficulty can be found with any other identifier in the RADIUS framework, that either expects the wireless client device address to be stable, or express an identifier that is not shared outside of the primary recipient (of that identifier value).

Embodiments of this disclosure provide a technical solution to the technical problem described above by introducing a new SMI attribute, and by defining an exchange method between the wireless infrastructure, the wireless client device, and a network service, such as an authentication service (e.g., a RADIUS service), for that identifier.

A mechanism is provided for one side to communicate to the other (AP or a wireless local area network (LAN) controller (WLC) to network service or network service to the AP or WLC) the SMI that the transmitting side has established (when it has established one). This allows both sides to continue the client session beyond RCM events, and share the same label to refer to the machine (despite the wireless client changing its device address). In some embodiments, the SMI attribute format conforms to RFC 8625 and/or RFC 6929. Its payload can have various contents, however, content structure in one embodiment is a 48-bit value.

Some embodiments include a method for a SMI to be exchanged between a wireless client device, an access network infrastructure operating as a NAD, and a network service (e.g. a RADIUS server). These embodiments recognize that under certain circumstances, a wireless client device does not exchange any SMI with the NAD nor with the network service. Generally, forcing identification of the wireless client device in this circumstances could present privacy concerns, and thus is not suggested. Instead, the disclosed embodiments are directed to wireless client devices that do generate an SMI and provide the SMI to a network component (e.g., a NAD or a RADIUS service). The wireless client device also allows the network components to share the SMI with other network components to facilitate the provision of network services on behalf of the wireless client device. Many traditional methods result in one group of network devices recognizing a plurality of device addresses (resulting from sequential address rotations by a single wireless client device) as originating from the single wireless client device, with another group of network devices recognizing each of the plurality of device addresses as a different device. This results, in some environments, in session instability. When a wireless client device has agreed to share its identity information, network infrastructure should function so as to avoid such session instability.

The following table describes features of the disclosed embodiments:

TABLE 1

| Wireless client device does not support the exchange of SMI information, or it supports SME exchange but it is not enabled via configuration, or if SMI exchange is supported and configured | NAD SMI not supported | NAD SMI supported not enabled | NAD SMI supported and enabled |
|---|---|---|---|
| Authentication, Authorization, and Accounting (AAA) SMI not supported | N/A | N/A | An AAA server supporting the SMI attribute returns an accept message. The authentication service records the SMI value for that client if included in a request message. AN authentication service that does not include SMI support is unable to process the request and responds to a request message indicating an SMI attribute with a reject message, a negative acknowledgment message, or does not respond. Some embodiments of a NAD record an indication of whether the authentication service supports or does not support SMI, and then bases any future requests to the authentication service on this recorded indication. In some cases, an authentication service detects an anomaly in an SMI (format |
| AAA SMI supported not enabled | N/A | N/A | |

TABLE 1-continued

| Wireless client device does not support the exchange of SMI information, or it supports SME exchange but it is not enabled via configuration, or if SMI exchange is supported and configured | NAD SMI not supported | NAD SMI supported not enabled | NAD SMI supported and enabled |
|---|---|---|---|
| | | | error, duplication, suspicion of impersonation or other malicious detection). In this case, the authentication service return to the NAD a warning in the form of a vendor considers the authentication as validated and specific attribute, thus causing the NAD to reject or contain the noncompliant SMI value. |
| AAA SMI supported and enabled | N/A | N/A | See descriptions of configurations 2, 3 or 4 below. |

Note that in the discussion of Table 1 above, if a wireless client device does not support an SMI value, or supports the SMI value but is not configured to do so, the authentication server still uniquely identifies the wireless client device. For example, in some embodiments, a wireless client device supports an SMI capability, and thus either provides an SMI value to a network infrastructure component or obtains an SMI value from the wireless infrastructure.

In other embodiments, the wireless client device does not support passing of SMI information, yet still participates in an authentication process (e.g. 802.1X EAP authentication). As a result of the authentication, the RADIUS server, in some cases, identifies the wireless client device. For example, in some embodiments, the wireless client device passes certificate information to the RADIUS server, which can serve to uniquely identify the wireless client device (irrespective of a device address used by the wireless client device). Other information also can serve to identify the wireless client device without reference to a device address. The above examples contrast with user authentication, which allows an authentication server to identify a user, but not necessarily a device.

As demonstrated by the table above, several different network configurations are contemplated by the disclosed embodiments. In a first configuration, the wireless client device does not implement support for a SMI. In this case, seamless transition of network services from a first device address to a second device address can be a challenge.

In a second network configuration, the wireless client device supports a stable machine identifier, and that identifier is exchanged over a protected frame with a NAD, such as an AP. In this configuration, an authentication service, such as a RADIUS service, receives a user authentication (but does not receive a machine authentication or a stable machine identifier). Thus, the authentication service functions to authentication a user, but not the wireless client device. In this configuration both the network infrastructure component (e.g., AP) and the authentication service (e.g. RADIUS) support an SMI attribute.

With the second network configuration, the wireless client device initially joins the network in a constrained state, and proceeds through an 802.1X or an EAP authentication phase.

The wireless client device identifies itself during the authentication using a locally administrated device address (e.g. second bit of first octet set). This device address is visible to the NAD (i.e. as a source device address in messages transmitted by the wireless client device) and to the authentication service (e.g., via a Calling-Station-ID attribute parameter in RADIUS). The authentication service validates the user identity. After validation is complete (e.g. the RADIUS service returns an Access-Accept), keying material is built on the wireless client device and NAD side.

Continuing with the discussion of the second configuration, once authentication is completed and a protected link has been established between the wireless client device and access network infrastructure (e.g., acting as a NAD), the wireless client device exchanges a SMI with the infrastructure. In some embodiments, the wireless client device provides a SMI to the NAD. In another embodiment, the wireless client device requests a SMI from the NAD. This embodiment shifts creation and management of SMI values to the network infrastructure (thus also limiting the risk of wireless client device fingerprinting via its SMI generation method). In embodiments that have the wireless client device generate the SMI, the NAD records the identifier and uses it as an SMI (some other embodiments have the NAD generate a SMI regardless of whether the wireless client device also generates an SMI. In these embodiments, the NAD SMI is mapped to the wireless client device SMI. When the wireless client device requests a SMI value, the NAD verifies whether the SMI was exchanged with the authentication service. In some embodiments, a NAD stores a log of device addresses used. In some embodiments, this log is used to detect attacks, e.g., spoofing.

With the second configuration, in some embodiments, the NAD sends a new access-request message to the authentication service. The SMI attribute is added with the value to the value exchanged with the wireless client device as described above if the NAD received the SMI value from the wireless client device, and the Calling-Station-Identifier is the RCM device address. If the wireless client device is requesting the SMI, the SMI payload is set to a null data value.

An authentication service supporting an SMI attribute considers, in some embodiments, the authentication as already validated and returns an acceptance indication (e.g. an access-accept message in RADIUS based authentication). The authentication service records the SMI value for that wireless client device if it was included in the acceptance indication. If an authentication service does not support SMI, it will be unable to process a request including an SMI value and responds with a negative acknowledgement indication (e.g. an Access-Reject with RADIUS authentication), or does not respond. Some embodiments store an indication of whether the authentication service supports SMI, such that queries as to the authentication services support are not repeated unnecessarily. In some cases, an authentication service detects an anomaly in an SMI value (e.g., format error, duplication, suspicion of impersonation or other malicious detection). The authentication service then returns to the NAD a warning in the form of a vendor specific attribute (VSA), thus causing the NAD to reject or contain the offender.

If the NAD request had the SMI attribute value pair (AVP) set to a null data value and the authentication service does not uniquely identify the wireless client device, the authentication service returns, in some embodiments, a response indicating acceptance (e.g. an Access-Accept message with a RADIUS authentication service) and the SMI AVP set to the null data value. The NAD then generates a local SMI for the wireless client device, and sends it to the wireless client device via a protected frame, and to the authentication service as described above.

When the wireless client device rotates its device address, the wireless client device first terminates, in some embodiments, its current session(s) or rotates its device address while maintaining one or more sessions. Various standards implement various modes at this point (e.g., session continuity may be ensured via the wireless client device exposing its new device address in a protected frame before rotation, or other methods). The session may thus continue (from the network access infrastructure standpoint) or be broken. When the session continues, the NAD may express a stable MAC address to the authentication service, resulting in the authentication service not being notified that the wireless client device has rotated its device address. When a device address change is visible to the authentication service (e.g. a change to the Calling-Station-ID), as the wireless client device initiates a new authentication request to the authentication service, the Calling-Station-ID parameter indicates the new device address, and the authentication service recognizes the wireless client device as a new device. The authentication that then is performed authenticates the user but not the device. In this context, a machine authentication is an authentication that relies on credentials present in a group designated for credentials of a machine (e.g. a "computers" group). A user authentication is an authentication that relies on credentials present in a group designated for credentials of a user or group of users (e.g. "users").

Prior to, during or at the end of the authentication process, in a protected frame, the wireless client device confirms its stable identifier to the network access infrastructure in at least some embodiments. At the end of the re-authentication phase, the NAD then returns an access-request message mentioning both the new Calling-Station-ID and the SMI. The authentication service records the unicity of the device across both device addresses. This information can be used to flush an older entry, provide continuation of policies (posture) or other purposes.

A source of the SMI (the wireless client device or the NAD) may update the SMI value. At that time, the NAD sends to the authentication service the updated SMI. Thus, the SMI is a new attribute to a session identity that the authentication service is tracking.

In a third configuration, the wireless client device implements a stable machine identifier, and that identifier is provided to the authentication service as part of an authentication process (thus providing a machine authentication). In this configuration, the network infrastructure does not exchange an SMI value with the wireless client device. Yet the wireless client device expects continuity of session traffic as the device address of the wireless client device rotates. Both the NAD and the RADIUS server support the SMI attribute.

With the third configuration, the client joins the network, but the authentication service (e.g., a RADIUS server) validates a machine identity, or validates a user identifier based on an identifier that is also unique to a particular machine. After the NAD and the wireless client device have established a secure connection, a stable identifier exchange does not necessarily occur. The NAD sends to the authentication service a request message (e.g., a RADIUS Access-Request message) that indicates a Calling-Station-ID and an SMI AVP. A payload of the request is set to the null data value. As the authentication service uniquely identifies the machine, the authentication service interprets the null data value as i) the NAD supports the SMI AVP, ii) the NAD does not have an SMI for this wireless client device and iii) the NAD requests the SMI for the wireless client device, if available. The authentication service responds to the request with an accept message (e.g., a RADIUS Access-Accept message), with the accept message indicating an SMI value that is associated with the Calling-Station-ID. When the wireless client device utilizes a stable MAC station address (e.g., locally-significant bit set to zero (0)), the SMI may contain the wireless client device Calling-Station-ID value (e.g., wireless client device MAC address), or another identifier determined by the authentication service, which can be implementation-specific. An authentication service that does not support SMI can return an Access-Reject message in response to the Access Request. In other cases, the authentication service supports the SMI AVP, but did not uniquely authenticate the machine (e.g. performed a user authentication). In this case, the authentication service returns an acceptance message (e.g., RADIUS Access-Accept message). The acceptance message includes the SMI AVP, and a payload value set to null. Based on the null data value in the acceptance message, the NAD records that no SMI is available for this wireless client device.

If the authentication service returns a valid SMI value, the NAD records this identifier as a stable value of the wireless client device. Later, the wireless client device rotates its device address, and the wireless client device does not express a stable identifier to the NAD during that phase. As a result, the NAD thus considers the new device address as a new wireless client device and initiates 802.1X authentication.

When the authentication completes, the authentication service and the NAD operate as described above, with the NAD sending to the authentication service a request message indicating the calling identifier, the SMI AVP, and a null payload value. The NAD uses this value to recognize that the new device address identifies the same wireless client device as the previous device address. The NAD then uses this awareness to facilitate network operations (e.g. flush previous device address cached keys, ensure Internet Protocol (IP) address continuity (e.g., dynamic host control protocol (DHCP) proxy), inform upstream devices (gratuitous address resolution protocol responses) or others).

In a fourth configuration, both the network infrastructure and the authentication service receive a SMI value. The identifier may not be equivalent at both devices. Both the NAD and the RADIUS server support the SMI attribute. In the fourth configuration, a wireless client device joins a network. As no secure link has been established with the NAD, the infrastructure sends a request message to an authentication service (e.g., a RADIUS Access-Request message). The authentication service uniquely identifies the wireless client device. Once a protected link has been established, the wireless client device requests from the NAD a stable identifier or provides to the NAD a stable identifier. This identifier may be different from that established by the authentication service. After keying material is exchanged between the NAD and the wireless client device (e.g. via authentication), the NAD sends a request message (e.g. RADIUS Access-Request message) to the authentication service, with the request message indicating the SMI AVP. The AVP value may be the wireless client identifier or a null data value. If the payload is a null data value, the authentication service interprets the null data value as indicating that the NAD supports the SMI AVP, and that the NAD does not have an SMI for this wireless client device, and the NAD requests the SMI for the wireless client device from the authentication service. If the payload contains a SMI value, the RADIUS compares the value to its own SMI value for that client. Some implementations may decide to conserve both values, some others may decide to replace the SMI of the authentication service with the SMI forwarded by the NAD. The authentication service returns to the NAD an accept message (e.g., a RADIUS Access-Accept message), optionally with the SMI AVP value provided by the NAD. The NAD records the accept message to signify that the SMI was successfully recorded by the authentication service.

Before a device address rotation occurs, a wireless client device expresses, in some embodiments, the upcoming device address and a Calling-Station-ID may not change. If the Calling-Station ID changes, the NAD initiates a new 802.1X process. In some embodiments, the updated SMI for the wireless client device and the new device address are provided to the NAD (the NAD derives that the wireless client device is the same with a new device address). In a request message (e.g. Access-Request message) following completion of authentication, the SMI is present and its value is the representation that the NAD and the RADIUS server agreed to represent the client. The RADIUS server may then use this value to expedite the authentication exchange or to re-authenticate the device.

In some embodiments, the NAD has not received prior to the change the client identifier and the new MAC. Thus, the NAD interprets the new device address as representing a new wireless client device, which is then processed as described above.

In a fifth configuration, the authentication service does not support an SMI attribute. In some of these configurations, a NAD provides support for an SMI exchange with the wireless client device, but does not support the SMI attribute.

In a sixth configuration similar to the third configuration above, the NAD does not support the SMI attribute. In some examples of this configuration, the authentication service authenticates the machine, but does not support the SMI attribute.

In at least some embodiments of the configurations discussed above, the wireless client device makes use of a locally-administered address. The device address may be transient and change over time (e.g., consistent with implementation of a periodic address rotation or rotation over a randomized interval length) or may be stable. Thus, some embodiments utilize their burned in address (BIA), or an otherwise stable/sticky locally administered address. Additional benefits are provided in the disclosed embodiments when address rotation is employed.

As a result of the above embodiments, the NAD and the authentication service agree on a stable identifier value for the wireless client device that persists even when the wireless client device rotates its device address. This identifier can be used to identify the wireless client device by both the wireless client device, the NAD, and the authentication service.

FIG. 1 is an overview diagram of a network implementing address rotation according to an example embodiment. The network 100 includes a wireless client device, shown as three different device instances. A first wireless client device instance 102A identifies itself on a wireless network via a first device address (e.g. a MAC station address). A second wireless client device instance 102B identifies itself on the wireless network via a second device address. A third wireless client device instance 102C identifies itself to the wireless network via a third device address. Note that each of the first wireless client device instance 102A, second wireless client device instance 102B, and third wireless client device instance 102C represent a single device expressing different device addresses on the network 100. FIG. 1 also shows a second wireless client device 103, that identifies itself on the wireless network via a fourth device address.

The first wireless client device instance 102A and the second wireless client device instance 102B are associated with, and/or in communication with, a first access point (AP) 104A. The third wireless client device instance 102C is associated with a second AP 104B. Each of the first AP 104A and the second AP 104B are in communication with an authentication service 108. When first communicating with an AP, a wireless client device performs an authentication process, such as an 802.11X authentication of an EAP authentication, via the AP, the authentication service 108.

As the wireless client device rotates its device address, the authentication service 108 traditionally views the device having the updated device address as a different device, as the authentication service 108 traditionally identifies each device based on its respective device address. The disclosed embodiments provide for improved integration between the authentication service 108 and a wireless client device that is rotating its device address. Thus, in at least some cases, the authentication service 108 is able to recognize when a device rotates its device address, and thus preserve state information relating to the device in a manner that it independent of which device address the device is expressing on the network 100. For example, FIG. 1 shows that the authentication service 108 maintains a data store 110 that maps a device address to a stable machine identifier. The data store 110 is shown to include three mappings 112, each mapping a common single machine identifier (SMI) to three different device addresses (those used by the device 102 when identifying itself via each of the first device address, second device address, and third device address. The data store 110 also includes a mapping 114 that maps a second SMI of the second wireless client device 103 to the fourth device address. FIG. 1 also illustrates the data store 110 including a mapping 116 from a first identifier to a second identifier. The mapping 116 is generated, in some embodiments, when a NAD device and an authentication service each arrive at different SMI values for a common wireless client device.

Figure 2:
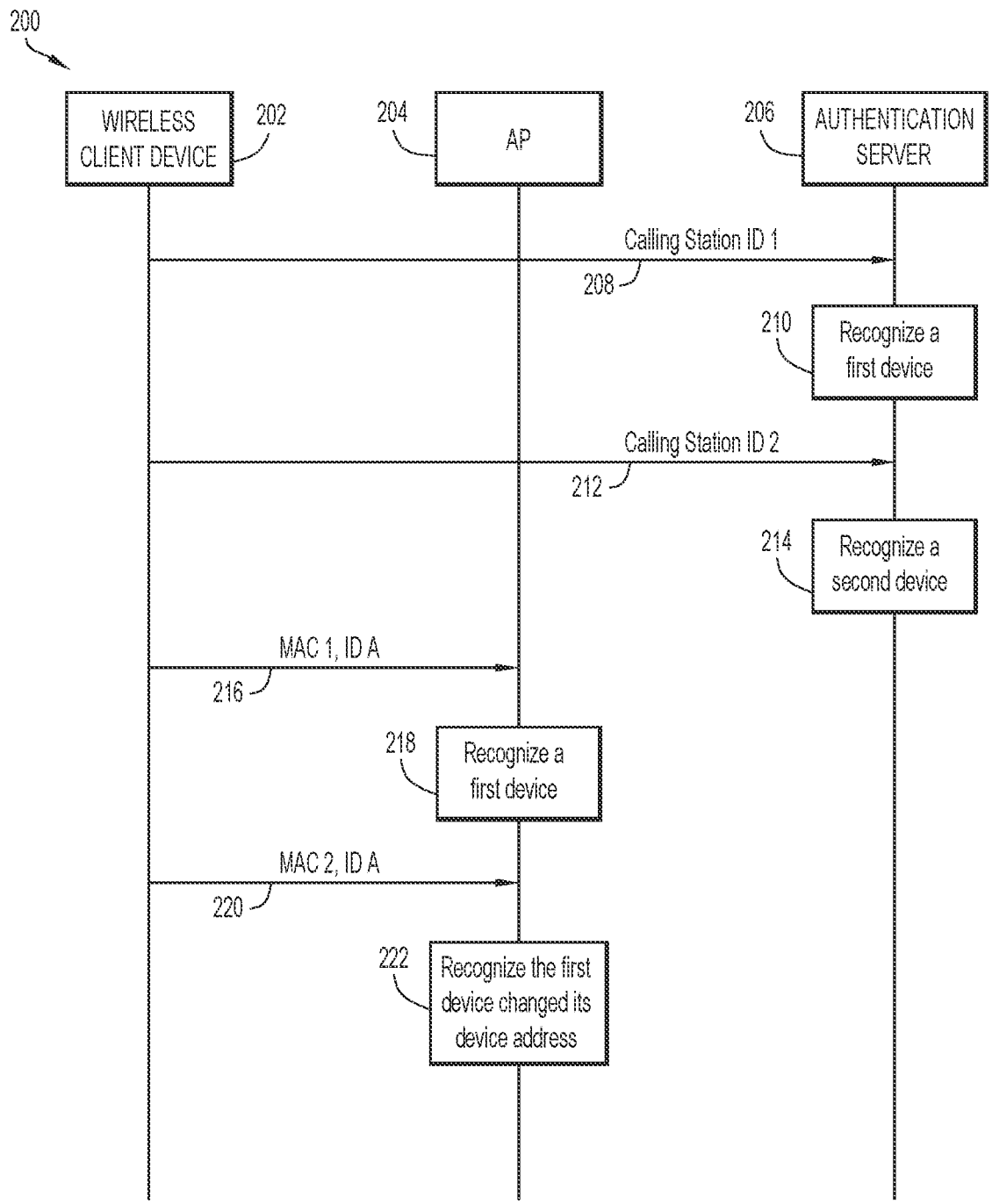
FIG. 2 is a sequence diagram illustrating a network environment that includes a wireless client device that supports stable machine identifier (SMI) exchange with an access point (AP) via a secure frame, according to an example embodiment.

FIG. 2 is a sequence diagram 200 illustrating a network environment that includes a wireless client device 202 that supports SMI exchange with an AP 204 via a secure frame. FIG. 2 illustrates the wireless client device 202 authenticating against an authentication service 206. The first authentication 208 includes passing, by the wireless client device 202, a Calling-Station-ID to the authentication service 206. The authentication service 206 recognizes the Calling-Station-ID as corresponding to a first physical wireless client device in step 210. The wireless client device 202 then sends a second Calling-Station-ID to the authentication service in a second authentication 212. In some embodiments, the wireless client device 202 rotates its device address between the first authentication 208 and the second authentication 212. As a result of the two different Calling-Station-IDs, the authentication service 206 incorrectly recognizes an existence of a second wireless device in block 214.

In contrast, the wireless client device 202 provides an SMI, and a device address, to the AP 204 in message 216. The AP 204 recognizes the wireless client device 202 in block 218. The wireless client device 202 then sends a message 220 indicating a second device address and the SMI. Because the SMI in the message 216 and message 222 are equivalent, the AP 204 is able to recognize that both of the message 216 and message 220 originate from the wireless client device 202. However, in the scenario described with respect to FIG. 2, there is an inconsistency between the AP 204's mapping of the wireless client device on the network (e.g. a single device that has changed its address), and the authentication service 206 mapping of the wireless client device (e.g. as two different devices).

Figure 3:
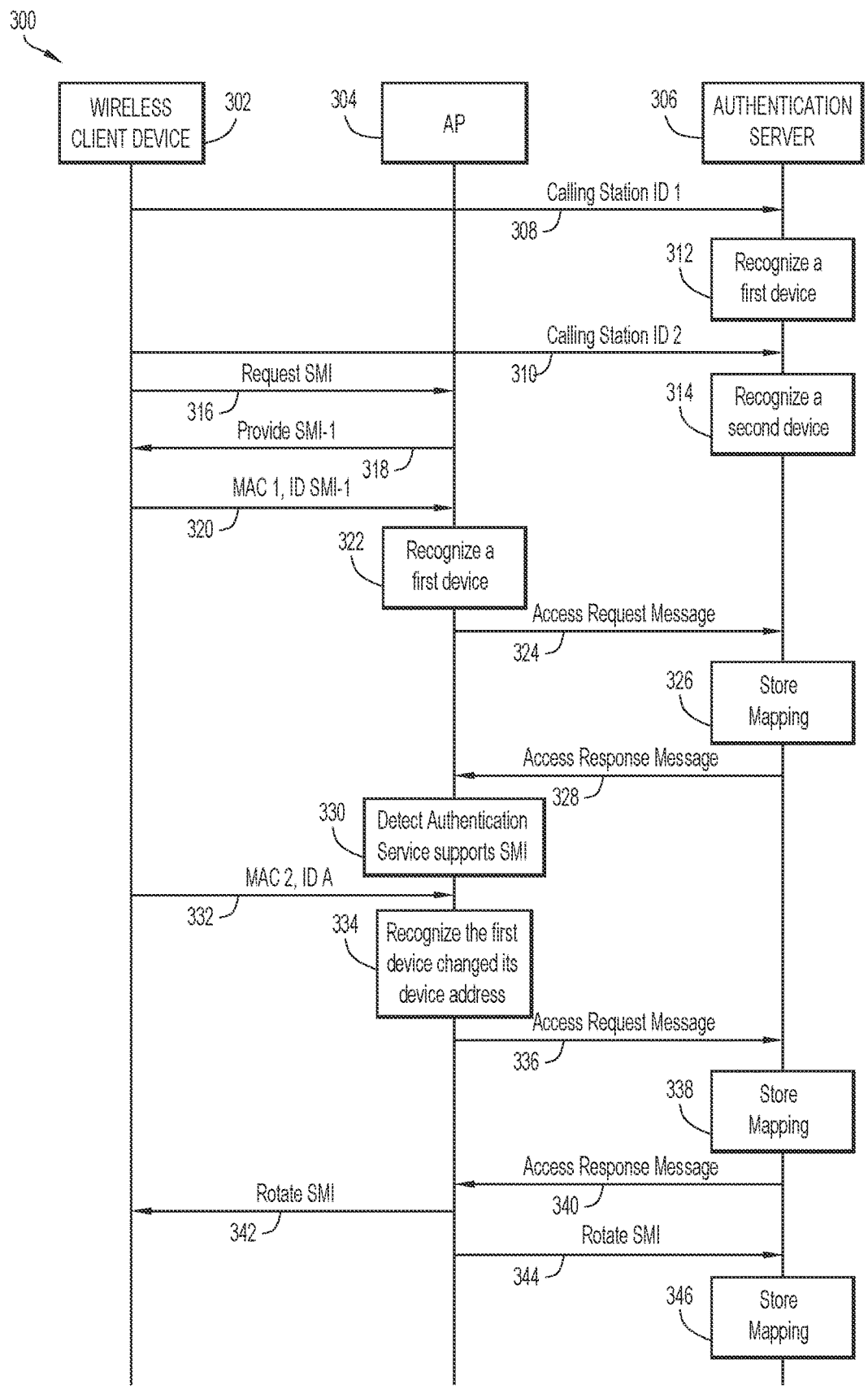
FIG. 3 is a sequence diagram showing improved coordination of a device address rotation between an AP and an authentication service via shared use of a SMI, according to an example embodiment.

FIG. 3 is a sequence diagram 300 showing improved coordination of a device address rotation between an AP and an authentication service via shared use of a SMI. As was the case in the scenario of FIG. 2, the wireless client device 302 performs two authentications against an authentication service 306. These are shown as a first authentication 308 and a second authentication 310. The first authentication 308 and/or the second authentication 310 are 802.1X EAP authentications in some embodiments. As a result of each authentication, the authentication service 306 recognizes the wireless client device 302 as two different devices in steps 312 and 314 respectively.

FIG. 3 also shows the wireless client device 302 requesting a SMI from the AP 304 via a request 316. The AP 304 provides an SMI to the wireless client device 302 in response 318. The wireless client device 302 then generates a message 320 that includes a first device address (e.g. "MAC1") and the SMI value provide in the response 318 (e.g., "SMI-1"). The message 320 is a protected frame in at least some embodiments.

The AP 304 then recognizes the message 320 is received from the wireless client device 302 in step 322. The message 320 is a protected frame in at least some embodiments. The AP 304 then transmits an access request message 324 to the authentication service 306. The access request message 324 includes a mapping between the SMI-1 and the first device address (e.g., "MAC-1"). In some embodiments, the access request message 324 also includes a mapping between the SMI-1 and the first Calling-Station-ID of first authentication 308 and/or the second Calling-Station-ID of the second authentication 310. Upon receiving the access request message 324, the authentication service 306 stores the mapping provided in the access request message 324 for future reference in step 326. The authentication service 306 also responds with a response message 328 acknowledging the data provided in the access request message 324. The response message 328 also encodes, in some embodiments, whether the authentication service 306 supports SMI exchange. Thus, in some embodiments, the response message 328 indicates that the authentication service 306 supports SMI exchange, and acknowledges the mapping provided, or otherwise indicates that SMI exchange is not supported and no mapping is stored as a result of the access request message 324.

Upon receiving the response message 328, the AP 304 stores an indication that the authentication service 306 supports an SMI indication features in step 330. The AP 304 then receives a data message 332 from the wireless client device 302. The data message 332 includes the SMI-1 previously provided to the wireless client device 302 by the AP 304. The data message 332 also identifies the wireless client device via a second device address (e.g., "MAC2"). Upon receiving the data message 332, the AP 304 recognizes that the wireless client device 302 has changed its device address in step 334. In response to the recognizing, the AP 304 generates a second access request message 336, providing a mapping of the SMI-1 to the second device address. The authentication service 306 records the mapping provided in the second access request message 336 in block 338, and responds with a second response message 340.

FIG. 3 also demonstrates an ability for the AP 304 to rotate the SMI assigned to the wireless client device 302. For example, FIG. 3 illustrates the AP 304 transmitting an SMI update message 342 to the wireless client device, indicating the wireless client device 302 should rotate its SMI from SMI-1 to SMI-2. An SMI update message 344 is also sent to the authentication service 306 from the AP 304. The authentication service 306 then updates, in step 346, its stored mappings based on the SMI update message 344.

Figure 4:
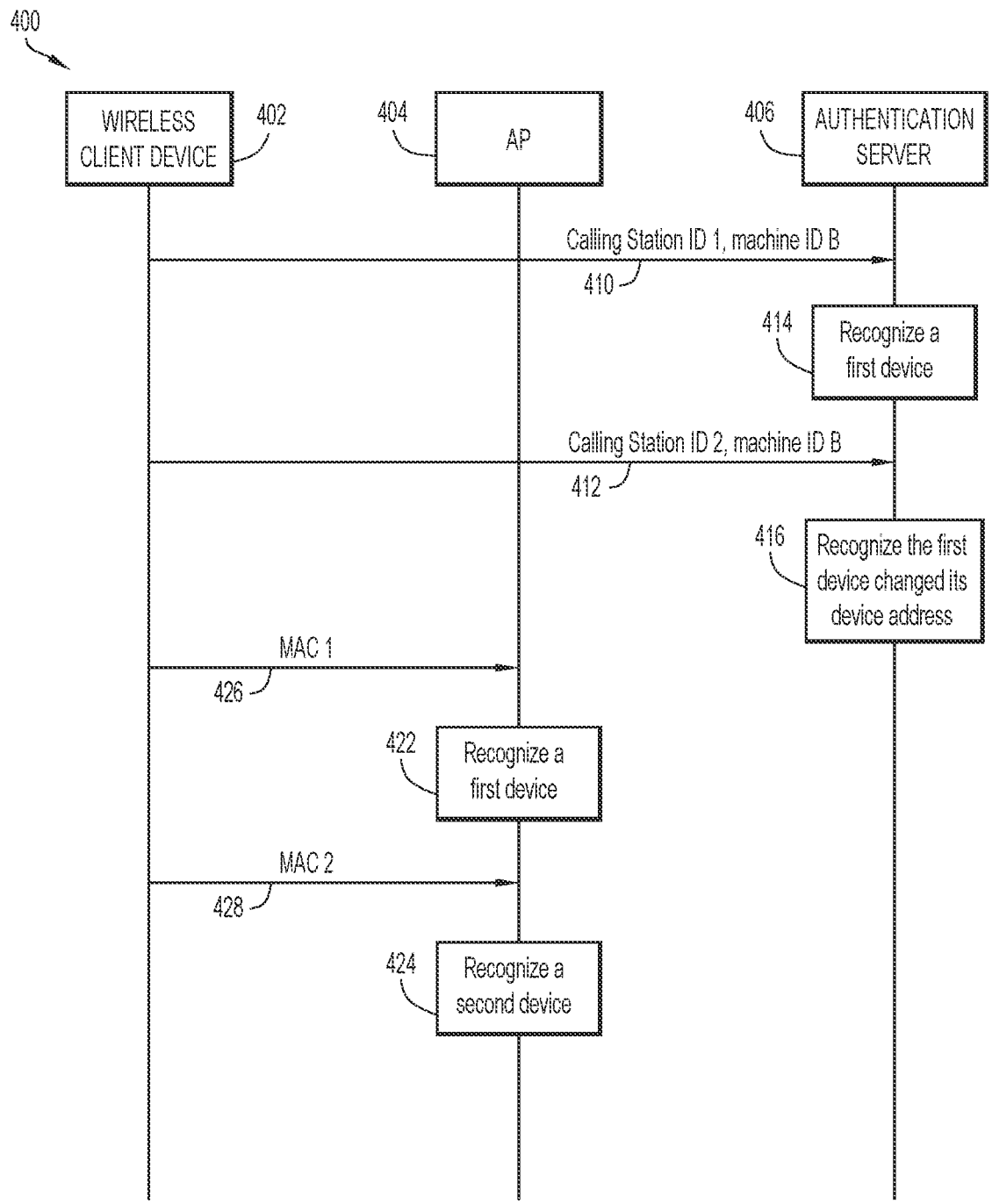
FIG. 4 is a sequence diagram of a communication environment in which an authentication service has access to data that can function as a stable machine identifier, according to an example embodiment.

FIG. 4 is a sequence diagram 400 of a communication environment in which an authentication service has access to data that can function as a stable machine identifier. FIG. 4 shows a wireless client device 402, AP 404, and authentication service 406. In the example embodiment of FIG. 4, the wireless client device 402 may or may not support a SMI, but does perform machine authentication with the authentication service 406. Two authentications are shown as a first authentication 410 and a second authentication 412. The first authentication 410 results in the authentication service 406 recognizing a first wireless device in step 414. Since the second authentication 412 includes the same machine identifier value as the first authentication 410, the authentication service 406 is able to use the machine identifier value as an SMI value, and can thus determine in step 416 that the wireless client device 402 has rotated its device address.

Thus, FIG. 4 demonstrates an embodiment of the authentication service 406 that maintains a value that can be used as a SMI. In FIG. 4, the wireless client device 402 does not exchange SMI information with a NAD (e.g. the AP 404). As a result, the AP 404 identifies two different wireless devices in each of steps 422 and 424 as a result of data message 426 and 428 respectively, which each identify the wireless client device 402 via different device addresses (e.g. "MAC1" v "MAC2").

Figure 5:
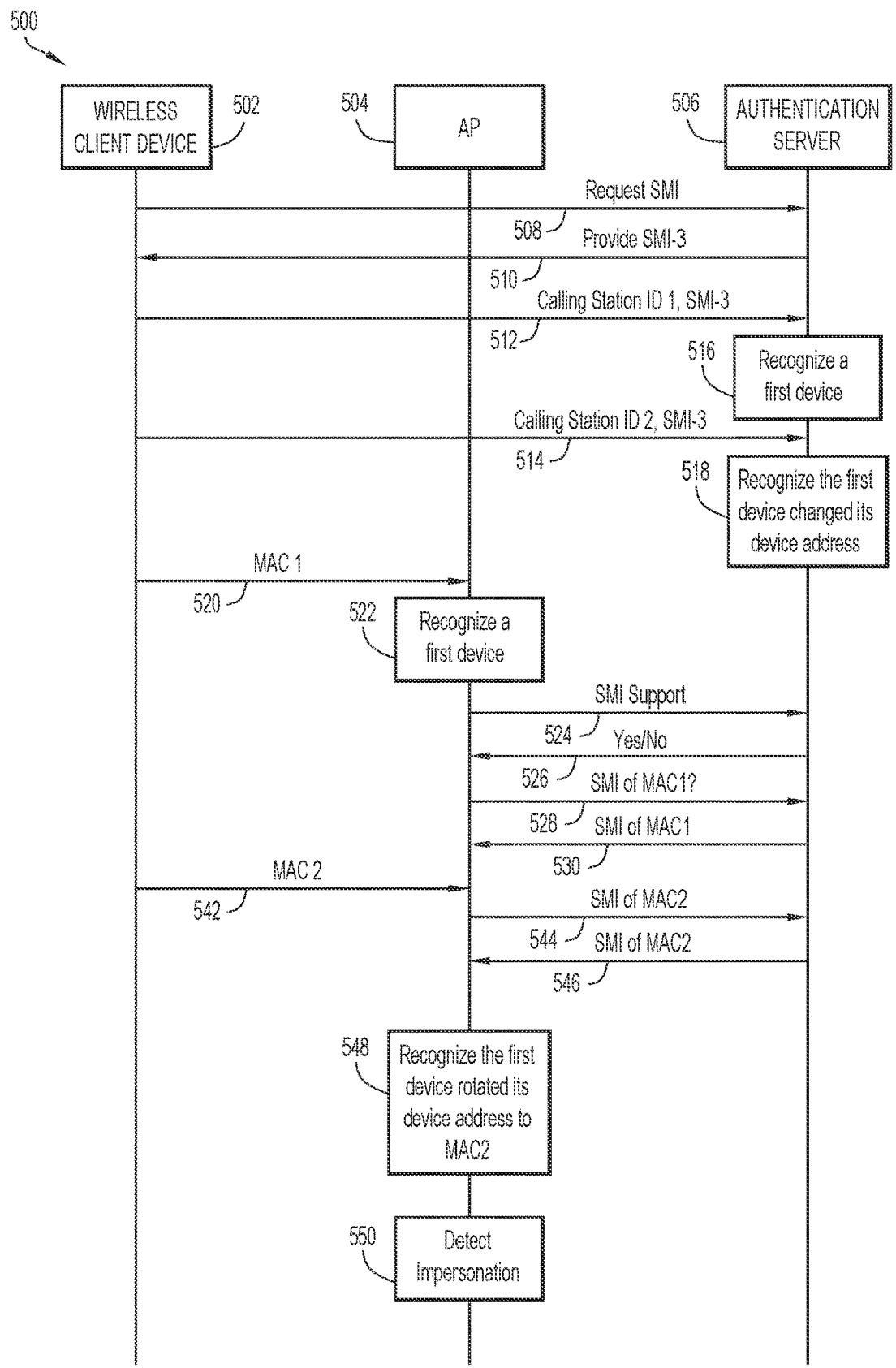
FIG. 5 is a sequence diagram of a communication environment in which an authentication service provides SMI mapping information to a network access device (NAD), according to an example embodiment.

FIG. 5 is a sequence diagram 500 of a communication environment in which an authentication service provides SMI mapping information to a NAD. FIG. 5 shows a wireless client device 502, AP 504, and an authentication service 506. FIG. 5 shows the wireless client device 502 requesting an SMI value from the authentication service 506 via request message 508. A response message 510 provides an SMI value to the wireless client device 502. The request message 508 and response message 510 are optional, and in some embodiments, the wireless client device 502 is able to generate a SMI identifier without assistance from the authentication service 506.

As was the case in the example of FIG. 4, in FIG. 5, the wireless client device 502 authenticates with the authentication service on two occasions, shown as authentication 512 and authentication 514, and provides two different Calling-Station-IDs in the two authentications. The wireless client device 502 also provides the SMI value provided to it in the response message 510 (or independently generated) in each of the authentication 512 and the authentication 514. Thus, the authentication service 506 recognizes a first unique device in step 516 and is then able to determine that the two authentications were generated by a common device in step 518.

FIG. 5 then shows the wireless client device 502 sending a message 520 the AP 504, with the message 520 specifying a first device address (e.g. "MAC1"). The AP 504 then identifies or stores a record that recognizes a physical device based on the first device address. The AP 504 is then shown providing a query, in step 522, the authentication service 506, via request 524, to determine whether the authentication service 506 supports mapping of SMI values. The authentication service 506 responds to the request 524 via response 526, providing an indication in the received response of whether it supports SMI mapping functions. Assuming the authentication service 506 does support SMI mapping functions, the AP 504 transmits a second query 528, requesting an SMI for the first device address noted by the AP 504 in the message 520. The authentication service 506 responds to the second query 528 with a second response 530, providing the SMI that it obtained during the authentications 512 and/or 514. The wireless client device 502 then sends a message 542 to the AP 504, with the message 542 utilizing a second device address (e.g., "MAC2") to identify the wireless client device 502. In response to receiving the message 542, the AP 504 queries the authentication service 506 for the SMI associated with the second device address (e.g., "MAC2") by providing or transmitting a query message 544. A response 546 from the authentication service 506 indicates that the second device address is also mapped to the SMI-3 identifier. The AP 504 is then able to recognize that the message 542 originated from the wireless client device 502 in step 548. The AP 504 is also able to detect device impersonation in block 550.

Figure 6:
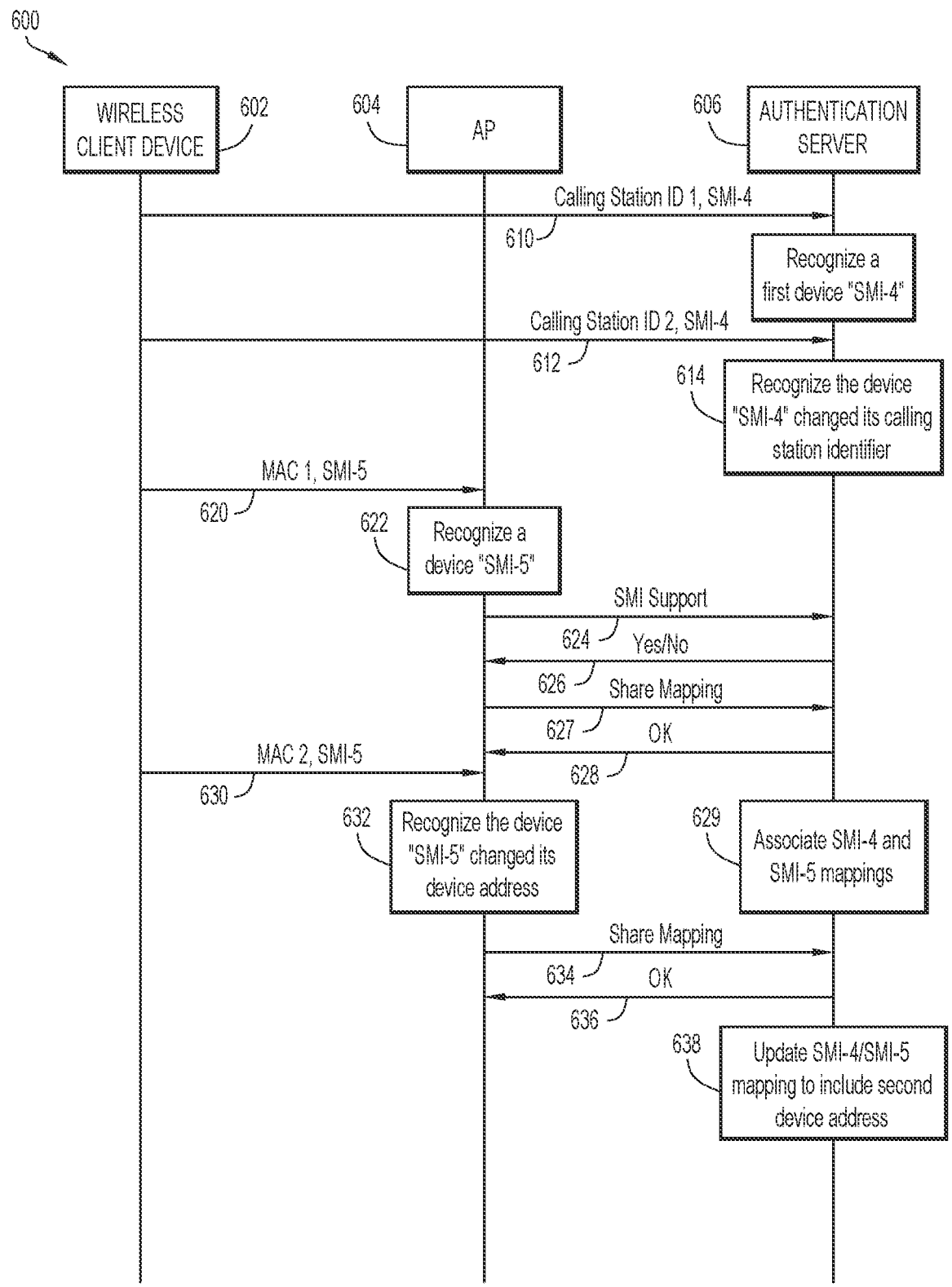
FIG. 6 is a sequence diagram of a communication environment in which a wireless client device communicates with a NAD, according to an example embodiment.

FIG. 6 is a sequence diagram 600 of a communication environment in which a wireless client device 602 communicates with a NAD. The NAD (an AP 604) and an authentication service 606 maintain different identifiers for an equivalent device. In the example of FIG. 6, a wireless client device 602 performs a first authentication 610 and a second authentication 612 with an authentication service 606. As each of the first authentication 610 and the second authentication 612 specify a common device identifier value (e.g. "SMI-4"), the authentication service 606 is able to recognize, in step 614, that the second authentication 612 is generated by the same device as the first authentication 610. One or more of the first authentication 610 and/or second authentication 612 are 802.1X EAP type authentications.

The wireless client device 602 then sends a message 620 to the AP 604, and identifies itself via a first device address in the message 620. The message 620 also includes an SMI identifier (e.g., "SMI-5"), which is not necessarily equivalent to the SMI provided to the authentication service 606. The AP 604 recognizes the wireless client device 602 as a first device in step 622. The AP 604 sends a query 624 to the authentication service 606, requesting an indication of whether the authentication service 606 supports SMI exchange. A response message 626 indicates the authentication service 606 support for SMI. Assuming the authentication service 606 does support SMI, the AP 604 then shares the mapping between the first device address and the SMI-5 identifier via mapping message 627. The authentication service 606 acknowledges receipt of the mapping message via response message 628. In some embodiments, the query 624 and the mapping message 627 are integrated into a single message. In these embodiments, the response message 626 and response message 628 are also indicated into a single response message.

Upon receiving the mapping message 627, the authentication service 606 is able to form, in step 629, an association between the SMI-4 based mappings, generated from the first authentication 610 and the second authentication 612, and the SMI-5 based mapping provided in the mapping message 627.

The wireless client device 602 then sends message 630, and identifies itself via a second device address, and also includes the identifier SMI-5. Because the message 620 and the message 630 both include the same SMI value (SMI-5), the AP 604 is able to determine that both messages originate from a common device in step 632. The AP 604 then shares a mapping of the second device address to the SMI-5 identifier in mapping message 634. The authentication service 606 acknowledges the mapping message 634 in response message 636. The authentication service 606 is then able to update its mappings of SMI-4/SMI-5 to reflect the second device address in step 638.

Thus, FIG. 6 illustrates that some of the disclosed embodiments provide for an AP or NAD to discover, through a request/response exchange with the authentication service 606, if the authentication service 606 supports SMI. If so, the AP or NAD and authentication service 606 exchange information so as to reconcile their SMI values (if different), and thus map an AP maintained SMI value (e.g., SMI-5) to an authentication service maintained SMI (e.g. SMI-4). Either side can then determine to use one value as a primary identifier for the wireless client device 602.

Figure 7:
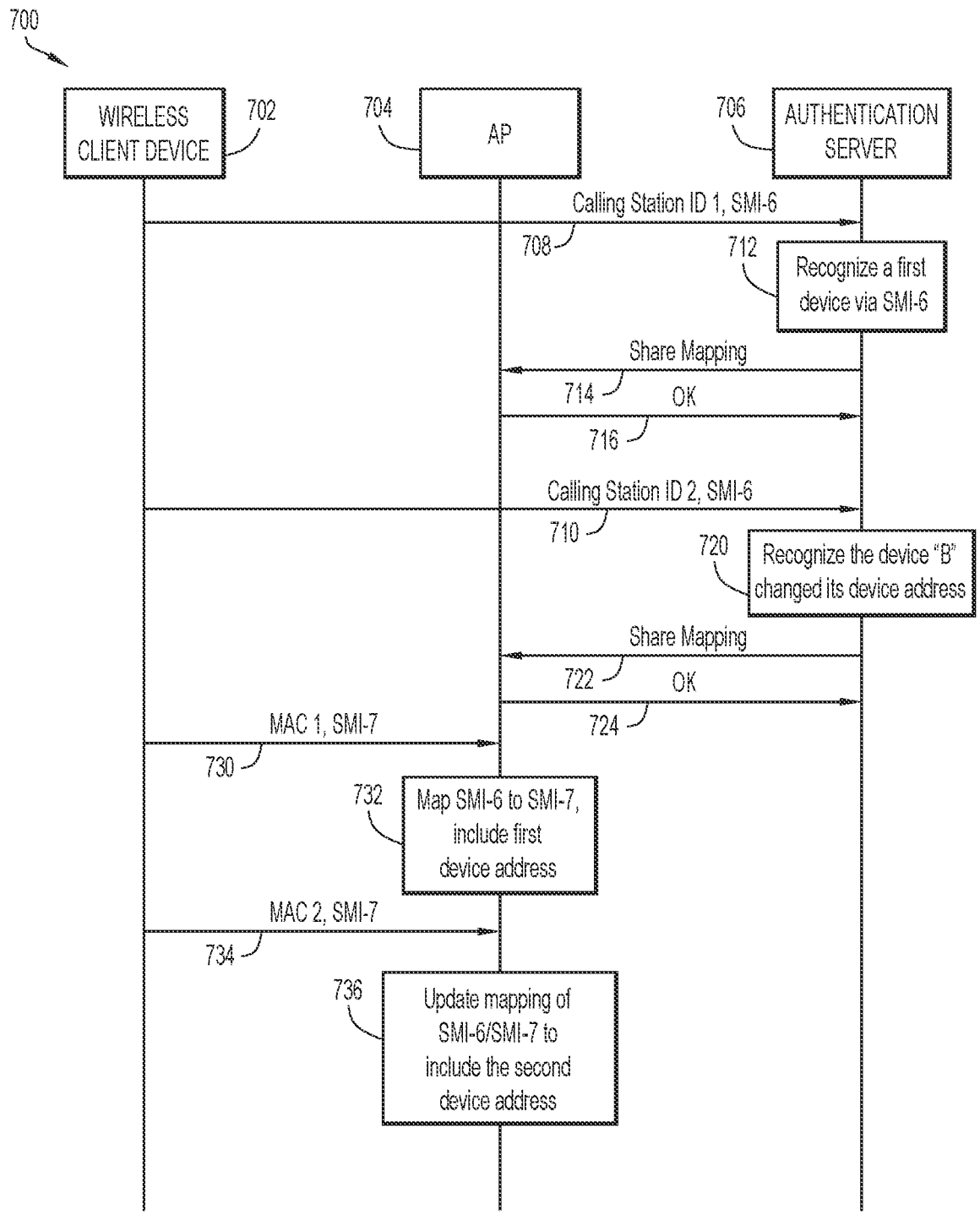
FIG. 7 is a sequence diagram illustrating message exchanges within a communication environment in which a wireless client device communicates with a NAD, shown as an AP, according to an example embodiment.

FIG. 7 is a sequence diagram 700 illustrating message exchanges within a communication environment in which a wireless client device 702 communicates with a NAD, shown as an AP 704. FIG. 7 shows the wireless client device 702 authenticating against an authentication service 706 in a first authentication 708 and a second authentication 710. The wireless client device 702 passes an equivalent SMI value in both the first authentication 708 and the second authentication 710 (e.g. "SMI-6"). Upon participation in the first authentication 708, the authentication service 706 recognizes the wireless client device 702 in step 712. As a result, the authentication service 706 shares the SMI information obtained during the first authentication 708 with the AP 704 via a mapping message 714, which is acknowledged by the AP 704 in response 716.

After receiving the second authentication 710, which specifies an equivalent SMI value as the first authentication 708, and a different Calling-Station-ID, the authentication service 706 determines that the device identified via the "SMI-6" identifier has changed its device address from the first Calling-Station-ID to a second Calling-Station-ID in step 720. The authentication service 706 then shares an updated mapping of the second Calling-Station-ID to the SMI value with the AP 704 via mapping message 722, which is acknowledged via response message 724.

The AP 704 then receives a message 730 from the wireless client device 702, which includes a different SMI value, "SMI-7", and identifies the wireless client device 702 via a first device address. As a result of receiving the message 730, the AP maps the SMI-6 value to the SMI-7 value in step 732. Upon receiving a message 734 that identifies the wireless client device 702 via a second device address, but that also provides the SMI-7 value, the AP 704 updates the mapping to include the second device address in step 736.

Figure 8:
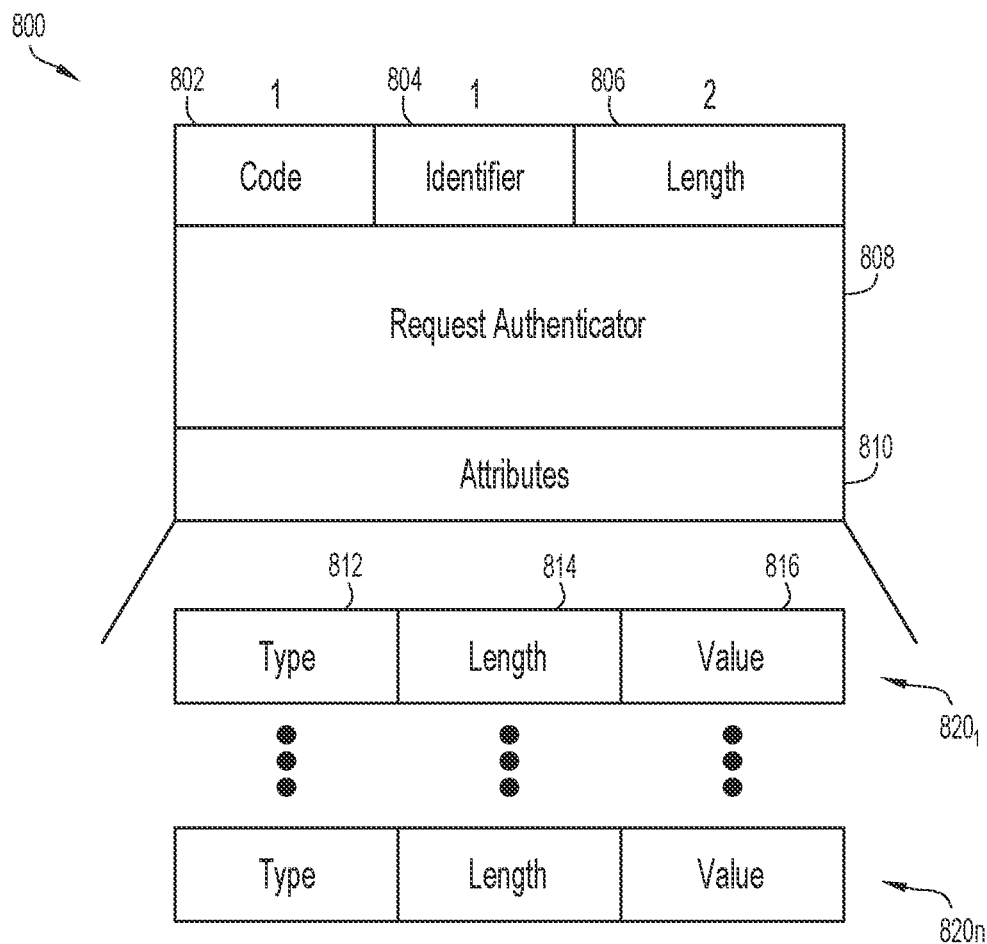
FIG. 8 illustrates an authentication message format in accordance with an example embodiment.

FIG. 8 illustrates an authentication message format in accordance with an example embodiment. The authentication message 800 includes a code field 802, identifier field 804, length field 806, request authenticator field 808, and an attributes field 810. The code field defines a type of authentication message. For example, a code field 802 value of one (1) indicates the authentication message is an access-request message. A code field 802 value of two (2) indicates an access-accept message in some embodiments. A code field 802 value of three (3) indicates an access-reject message in some embodiments.

The identifier field 804 allows a requestor to identify corresponding responses. A value in the identifier field 804 is changed by a requestor whenever content in the attributes field 810 is modified, or whenever a valid reply has been received for a previous request. Retransmitted messages maintain an equivalent value in the identifier field 804.

The request authenticator field 808 indicates a message authenticator for the authentication message 800. For example, in some embodiments, the request authenticator field 808 indicates a hash message authentication code (HMAC)-message digest algorithm five (MD5) checksum of the authentication message 800 or contents of an entire network message that includes the authentication message 800.

The attributes field 810 includes one or more attributes, and may be based on a type of the authentication message 800, as determined by the code field 802. Each attribute included in the authentication message 800 includes an attribute type field 812, a length field 814, and a value field 816. The attribute type field 812 indicates, via one of a set of predefined values, a type of attribute provided. The length field 814 indicates a length of the attribute to facilitate parsing through multiple attributes. The value field 816 indicates a value of the attribute itself. Multiple possible attributes in the authentication message 800 are represented by multiple attribute entries $820_1 \ldots 820_n$.

As discussed above, some embodiments provide Calling-Station-ID information via a Calling-Station-ID attribute (e.g., attribute type field 812 value of 31 in some embodiments). As discussed above, some embodiments include an SMI attribute in the attributes field 810 via a predefined constant value in the attribute type field 812. As discussed above, in some embodiments, the SMI attribute is included in the authentication message 800 but its value (e.g. the value field 816) is set to a null (e.g. zero) value. In other cases, when a device has an SMI value for a particular wireless client device, the SMI value is included in the value field 816.

Figure 9:
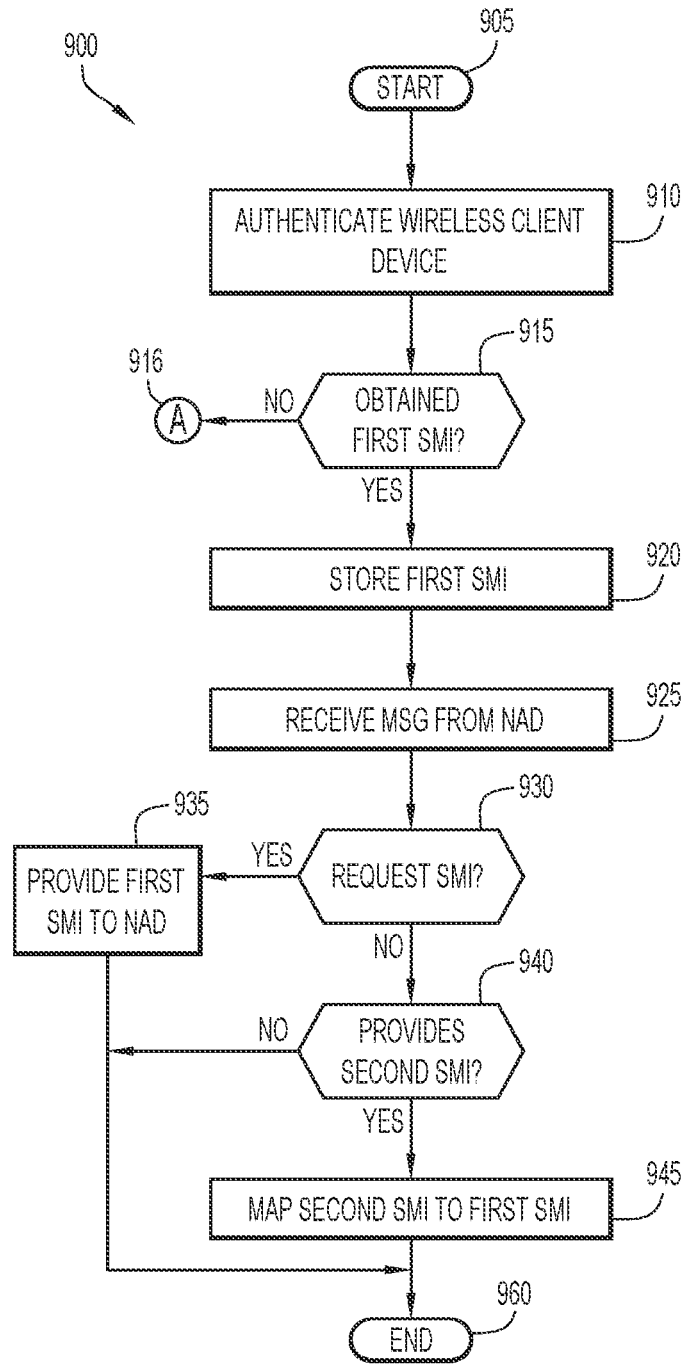
FIG. 9 is a flowchart of a method of exchanging SMI information of a wireless client device according to an example embodiment.

FIG. 9 is a flowchart of a method of exchanging SMI information of a wireless client device according to an example embodiment. In some embodiments, the method 900 discussed below with respect to FIG. 9 is performed by an authentication service, such as any of the authentication services 206, 306, 406, 506, 606, or 706 discussed above. In some embodiments, method 900 is performed by a RADIUS service. In the discussion of FIG. 9 below, a device performing the method 900 is referred to as an "executing device."

After start block 905, method 900 moves to operation 910. In operation 910, a wireless client device is authenticated. In some embodiments, the authentication performed in operation 910 is a RADIUS authentication. As part of the authentication, operation 910 receives from the wireless client device a Calling-Station-ID value. In some embodiments, the Calling-Station ID value is equivalent to a first device address in use by the wireless client device when it is performing the authentication. In some embodiments, the wireless client device passes an SMI attribute value to the executing device during the authentication.

Decision operation 915 determines if an SMI was obtained during the authentication of operation 910. If no SMI value is obtained, method 900 moves through off page reference 916 to the flowchart of FIG. 9, discussed below. If an SMI value is obtained from the wireless client device in operation 910, method 900 moves from decision operation 915 to operation 920.

In operation 920, the received SMI value is stored. Along with the SMI value, a mapping or association between the SMI value and the Calling-Station-ID value is also stored in some embodiments. Some embodiments of operation 920 also include performing a second authentication with the wireless client device. In the second authentication, the wireless client device is identified via a different (second) device address than was used in the first authentication of operation 910. The second authentication also includes the wireless client device expressing (e.g., communicating to the executing device via a message) the SMI value. Thus, in these embodiments, operation 920 determines that the second authentication request originates from the same wireless client device as the first authentication of operation 910, based on the SMI values presented in each authentication being equivalent. As a result of this determination, the executing device responds to the wireless client device with an acceptance message (e.g. an access accept message). The determination that both the first authentication of operation 910 and the second authentication originate from the same wireless client device allows for bypassing or otherwise inhibiting, by the authentication service, other authentication processes such as one or more of challenge (e.g., sending of an access-challenge message is inhibited), tunnel establishment (e.g. transmission of a tunnel-link-start attribute is inhibited), or in-tunnel authentication. By bypassing these processes, resources established as part of the first authentication of operation 910 with the first device address can be applied to the wireless client device when it uses the second device address. For example, the tunnel established during the first authentication when the wireless client device was identified via the first device address is reused during the second authentication with the wireless client device being identified via the second device address. Additionally, authentication credentials established via an in-tunnel authentication of the first authentication of operation 910 (when the wireless client device was identified via the first device address) are reused when the wireless client deice is identified via the second device address.

In operation 925, a message is received from a NAD, such as an AP. In some embodiments, the message is a request or a RADIUS access request message. Decision operation 930 determines whether the received message encodes a request for an SMI value of the wireless client device. For example, in some embodiments, a NAD devices encodes an SMI AVP in an access-request message, but sets the value to a null value to provide an indication that an SMI value is requested. If an SMI value is requested by the message, method 900 moves from decision operation 930 to operation 935, which provides the first SMI value to the NAD. In some embodiments, operation 935 includes generating an access-accept message, and encoding an SMI AVP indicating the SMI value obtained during the authentication. If the NAD did not request an SMI value, method 900 moves from decision operation 930 to decision operation 940. Decision operation 940 determines whether the message provides a second SMI value. As discussed above, some embodiments of an access request message transmitted by a NAD device encode an SMI AVP value. If a second SMI value is provided by the message, method 900 moves to operation 945, which generates a mapping from the second SMI value to the first SMI value. Thus, for example, operation 945 generates a mapping analogous to mapping 116 discussed above with respect to FIG. 1, at least in some embodiments.

After either of operations 935 or operation 945 complete, method 900 moves to end operation 960.

Figure 10:
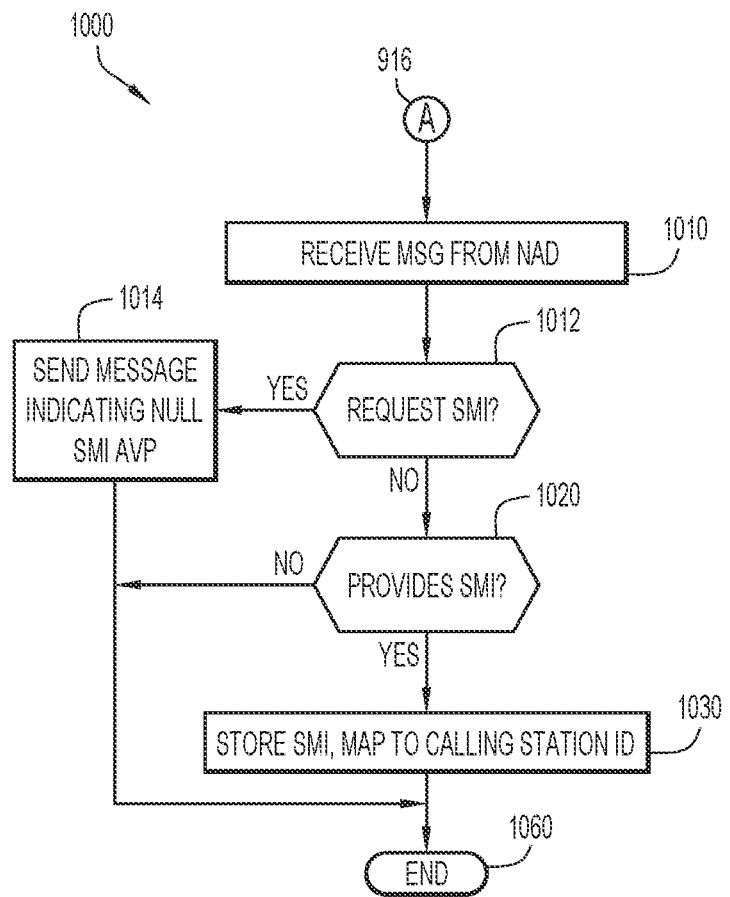
FIG. 10 is a flowchart of a method of exchanging SMI information of a wireless client device according to an example embodiment.

FIG. 10 is a flowchart of a method of exchanging SMI information of a wireless client device according to an example embodiment. The method 1000 begins with a continuation from off page reference 916 of FIG. 9. After off page reference 916, method 1000 moves to operation 1010, where a message is received from a NAD. In some embodiments, the message is a request message. In some of these embodiments, the message is a RADIUS access request message. In some embodiments, the message encodes an SMI attribute parameter. In some embodiments, the received message also includes a calling station identifier attribute.

Decision operation 1012 determines whether the received message requests an SMI value. As discussed above, in some embodiments, a NAD requests an SMI value by including an SMI AVP in the access request message, by setting the value of the AVP to a null or zero value. If an SMI value is requested, method 1000 moves from decision operation 1012 to operation 1014, which sends a message indicating that the executing device does not possess the requested SMI value. In some embodiments, such an indication is provided by encoding an SMI AVP in the response message and setting the SMI AVP to have a zero value. In some embodiments, the response message is a RADIUS access-accept message. If the message received in operation 1010 does not request an SMI value, method 1000 moves from decision operation 1012 to decision operation 1020, which determines if the received message provides an SMI value. Thus, for example, if the message encoded an SMI AVP with a non-null data value, in some embodiments, decision operation 1020 determines that the message included or provided an SMI value. If no SMI value is provided, method 1000 moves from decision operation 1020 to end operation 1060. If an SMI value is provided, method 1000 moves from decision operation 1020 to operation 1030, which stores an association between the provided SMI value and the calling station identifier (e.g., as illustrated above with respect to three mappings 112. For example, in some embodiments, the calling station identifier is also included in the message received in operation 1010. Thus, an authentication service is able to correlate the SMI provided in the message with a calling station identifier that may have been previously provided during authentication of the wireless client device.

Thus, as a result of the mapping stored in operation 1030, an authentication service is able to improve a second authentication performed by the wireless client device. For example, a security and/or quality of service (QoS) context of the wireless client device is restored after a device address rotation without a need to duplicate previous message exchanges that establish the security and/or QoS context.

Figure 11:
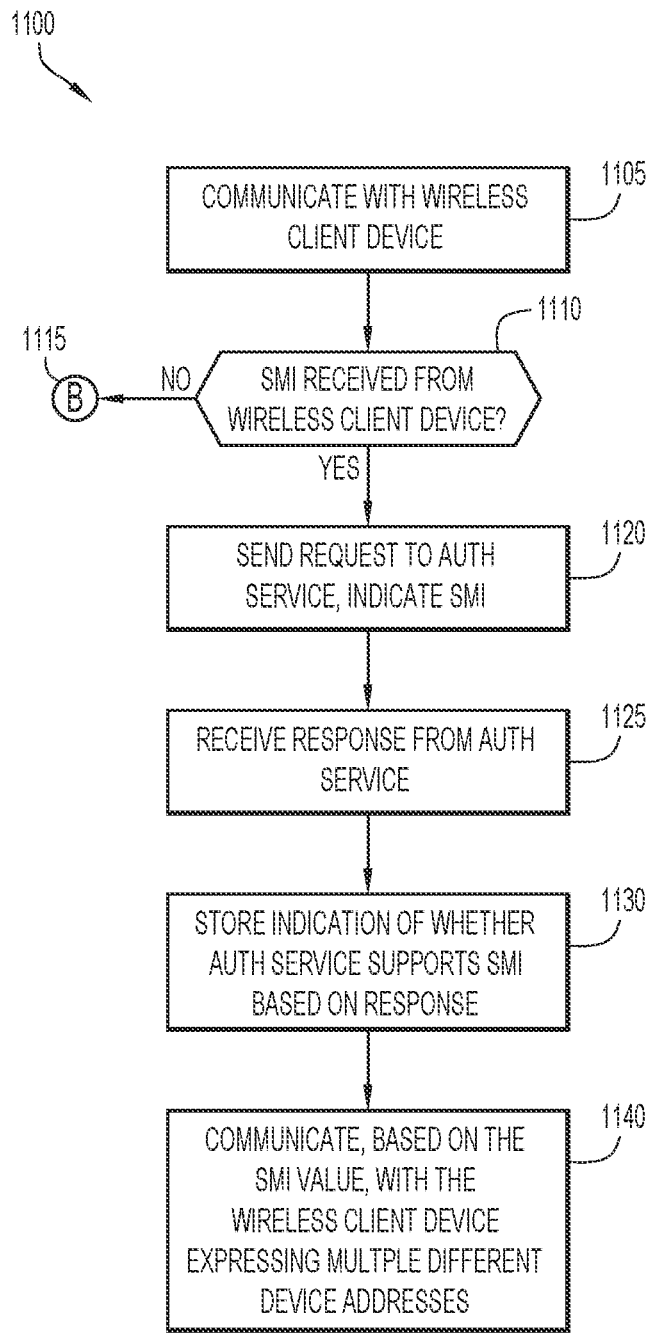
FIG. 11 is a flowchart of a method of passing an SMI value from a NAD to an authentication service.

FIG. 11 is a flowchart of a method of passing an SMI value from a NAD to an authentication service. In some embodiments, the method 1100 discussed below with respect to FIG. 11 is performed by a NAD device, such as an AP. In the discussion below, a device performing the method 1100 is referred to as an "executing device."

In operation 1105, communication occurs with a wireless client device. In some embodiments, the communication occurs over a secure communication channel, after an authentication and/or association process with the wireless client device have occurred. In some embodiments, operation 1105 includes receiving and decoding or otherwise parsing an action frame received from the wireless client device. The action frame encodes an SMI value in some embodiments. The SMI value is provided by the wireless client device to the NAD device performing the method 1100, at least in some embodiments.

Decision operation 1110 determines whether an SMI value was obtained from the wireless client device during the communication in operation 1105. If no SMI was obtained, the method 1100 moves from decision operation 1110 to off page reference 1115, which is further discussed below with respect to FIG. 11. If an SMI value was received during the communication of operation 1105, the method 1100 moves from decision operation 1110 to operation 1120, which sends a request message to an authorization service, with the request message indicating the SMI. In some embodiments, the request message is a RADIUS access-request message that encodes the SMI value as an SMI AVP in the access-request message.

In operation 1125, a response message is received from the authentication service. In some embodiments, the response message is an access-accept RADIUS message, or an access-denied RADIUS message.

In operation 1130, an indication of whether the authentication service supports the exchange of SMI values is stored. In some embodiments, if the message received in operation 1125 is an access-denied message, an indication is stored indicating the authentication service does not support SMI exchange. If the response message is an access-accept message, an indication is stored indicating the authentication service does support the exchange of SMI information.

In operation 1140, the wireless client device is serviced while the wireless client device expresses multiple different device addresses. The servicing of the wireless client deice is based on the SMI value. As an example, an SMI value of the wireless client device is obtained via the method 1100 as discussed above. When the wireless client device changes its device address, it again provides the same SMI value (in a similar manner as that discussed above with respect to operation 1105. Operation 1140 is able to retrieve policy information from a policy database based on the SMI value. The retrieved policy is then applied to wireless client device network operations as appropriate. For example, the wireless client device opens, in some embodiments, a session with a particular network application. The executing device applies a policy obtained via the SMI value, regardless of the device address used by the wireless client device to establish the session. Thus, this policy can persist across multiple device addresses of the wireless client device. For example, a policy limits, in some embodiments, a maximum network throughput or video resolution to be conveyed via the session of the wireless client device. The executing device applies such a policy to communications of the wireless client device, based on the SMI value, and regardless of the device address used by the wireless client device. Note that while operation 1140 is occurring, there is not necessarily a need to re-authenticate the wireless client device against the authentication server, since the executing device provides network access to the wireless client device, despite the multiple device address being used by the wireless client device, based on the cached SMI value.

Figure 12:
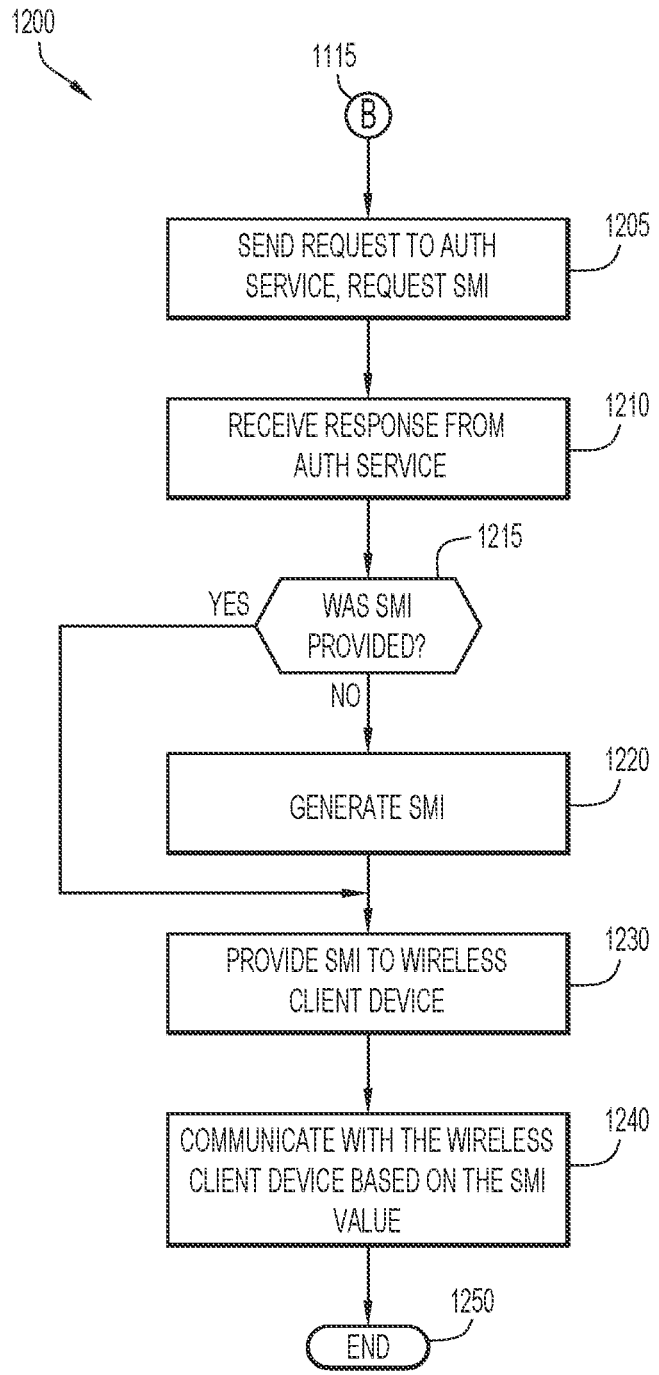
FIG. 12 is a flowchart of a method of providing an SMI value to a wireless client device.

FIG. 12 is a flowchart of a method of providing an SMI value to a wireless client device. FIG. 12 and method 1200 is a continuation of method 1100, discussed above with respect to FIG. 11, and begins from off page reference 1115, also discussed above with respect to FIG. 11. In some embodiments, the method 1200 is performed by a NAD, such as an access point.

Operation 1205, sends a request to an authentication service. The request is for an SMI value. The SMI value is requested, in some embodiments, by including an SMI AVP in the request (e.g. via attribute type field 812), with the SMI AVP value (e.g. value field 816) being set to a null data value. In some embodiments, the request is a RADIUS access-request message (e.g. code field 802 value of one (1)). In some embodiments, the request also encodes a device address of a wireless client device as a calling-station identifier attribute value (e.g., code field value of 31), for example as discussed above with respect to FIG. 8. Thus, operation 1210 also includes, in some embodiments, receiving a message from the wireless client device, with the message identifying the wireless client device via a source address field of the message. The source address field is set to the device address value that is included as a Calling-Station-ID.

In operation 1210, a response message is received. In some embodiments, the response is decoded as a RADIUS access-accept message or a RADIUS access-denied message. In some embodiments, receipt of a RADIUS access-denied message is interpreted to indicate that the authentication service does not support the exchange of SMI values (e.g. does not support the SMI AVP provided in the request message).

Decision operation 1215 determines if an SMI value was included in the received message of operation 1210. Thus, in some embodiments, decision operation 1215 decodes or otherwise parses the received message to extract any attribute values included in the message. If an SMI attribute value is include in the response message but is set to a null data value, this indicates the authentication service does not have an SMI value available for the wireless client device specified in the request message of the operation 1205. Thus, method 1200 moves from decision operation 1215 to operation 1220, where an SMI value is generated for the wireless client device. If an SMI attribute value is included in the response message and is not set to a null data value, the decision operation 1215 determines that an SMI value was provided, and moves to operation 1230. In operation 1230, the SMI is provided to the wireless client device. For example, some embodiments of operation 1230 include generating a frame encoding the SMI, and transmitting the frame to the wireless client device. In some embodiments, the frame is generated as an action frame, with the SMI encoded in the action frame.

A record of an association between the SMI value and the calling-station identifier attribute value (e.g. included in the operation 1205) is stored or maintained in a data store for future reference. In some embodiments, the association between the SMI and calling-station identifier attribute value is referenced when associating one or more network resources to the wireless client device. For example, in some embodiments, an IP address that was previously associated with or mapped to a first device address, is later updated to be mapped to a second device address when the first device address and second device address are both associated with a common SMI value.

In operation 1240, the executing device communicates with the wireless client device based on the SMI value. Note that in operation 1240, the wireless client device expresses multiple different device addresses to identify itself on the wireless network. Since the executing device is able to obtain the SMI of the wireless client device, the executing device retrieves policy information from a policy database based on the SMI value. The retrieved policy is then applied to wireless client device network operations as appropriate. For example, the wireless client device opens, in some embodiments, a session with a particular network application. The executing device applies a policy obtained via the SMI value, regardless of the device address used by the wireless client device to establish the session. Thus, this policy can persist across multiple device addresses of the wireless client device. For example, a policy limits, in some embodiments, a maximum network throughput or video resolution to be conveyed via the session of the wireless client device. The executing device applies such a policy to communications of the wireless client device, based on the SMI value, and regardless of the device address used by the wireless client device. Note that while operation 1240 is occurring, there is not necessarily a need to re-authenticate the wireless client device against the authentication server, since the executing device provides network access to the wireless client device, despite the multiple device address being used by the wireless client device, based on the cached SMI value.

After operation 1240 completes, method 1200 moves to end operation 1250.

Figure 13:
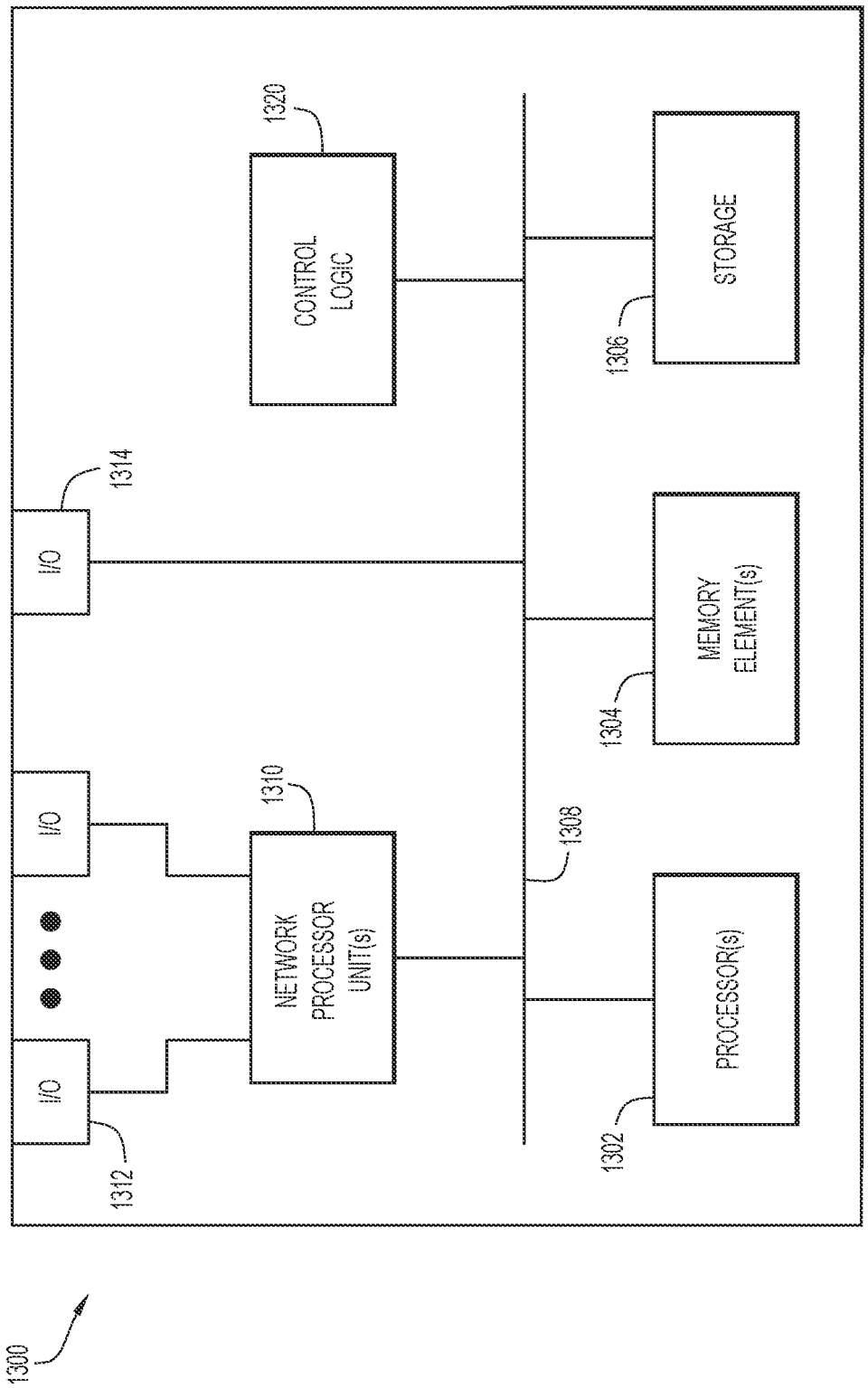
FIG. 13 is a hardware block diagram of a device that may perform functions associated with operations discussed herein in connection with the techniques depicted in any one or more of FIGS. 1-12.

FIG. 13 is a hardware block diagram of a device 1300 that may perform functions associated with operations discussed herein in connection with the techniques depicted in any one or more of FIGS. 1-12. In various embodiments, any of the devices described above (e.g., an AP, a wireless network controller, a NAD, a RADIUS service, and/or an AAA server) implement, in some embodiments, a computing architecture analogous to that described below with respect to the device 1300.

In at least one embodiment, the device 1300 may include one or more processor(s) 1302, one or more memory element(s) 1304, storage 1306, a bus 1308, one or more network processor unit(s) 1310 interconnected with one or more network input/output (I/O) interface(s) 1312, one or more I/O interface(s) 1314, and control logic 1320. In various embodiments, instructions associated with logic for device 1300 can overlap in any manner and are not limited to the specific allocation of instructions and/or operations described herein.

In at least one embodiment, processor(s) 1302 is/are at least one hardware processor configured to execute various tasks, operations and/or functions for device 1300 as described herein according to software and/or instructions configured for device 1300. Processor(s) 1302 (e.g., a hardware processor) can execute any type of instructions associated with data to achieve the operations detailed herein. In one example, processor(s) 1302 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 1304 and/or storage 1306 is/are configured to store data, information, software, and/or instructions associated with device 1300, and/or logic configured for memory element(s) 1304 and/or storage 1306. For example, any logic described herein (e.g., control logic 1320) can, in various embodiments, be stored for device 1300 using any combination of memory element(s) 1304 and/or storage 1306. Note that in some embodiments, storage 1306 can be consolidated with memory element(s) 1304 (or vice versa), or can overlap/exist in any other suitable manner.

In at least one embodiment, bus 1308 can be configured as an interface that enables one or more elements of device 1300 to communicate in order to exchange information and/or data. Bus 1308 can be implemented with any architecture designed for passing control, data and/or information between processors, memory elements/storage, peripheral devices, and/or any other hardware and/or software components that may be configured for device 1300. In at least one embodiment, bus 1308 may be implemented as a fast kernel-hosted interconnect, potentially using shared memory between processes (e.g., logic), which can enable efficient communication paths between the processes.

In various embodiments, network processor unit(s) 1310 may enable communication between device 1300 and other systems, devices, or entities, via network I/O interface(s) 1312 (wired and/or wireless) to facilitate operations discussed for various embodiments described herein. In various embodiments, network processor unit(s) 1310 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 1300 and other systems, devices, or entities to facilitate operations for various embodiments described herein. In various embodiments, network I/O interface(s) 1312 can be configured as one or more Ethernet port(s), Fibre Channel ports, any other I/O port(s), and/or antenna(s)/antenna array(s) now known or hereafter developed. Thus, the network processor unit(s) 1310 and/or network I/O interface(s) 1312 may include suitable interfaces for receiving, transmitting, and/or otherwise communicating data and/or information in a network environment.

I/O interface(s) 1314 allow for input and output of data and/or information with other entities that may be connected to device 1300. For example, I/O interface(s) 1314 may provide a connection to external devices such as a keyboard, keypad, a touch screen, and/or any other suitable input and/or output device now known or hereafter developed. This may be the case, in particular, when the device 1300 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, particularly when the device 1300 serves as a user device as described herein.

In various embodiments, control logic 1320 can include instructions that, when executed, cause processor(s) 1302 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1304 and/or storage 1306 can store data, software, code, instructions (e.g., processor instructions), logic, parameters, combinations thereof, and/or the like used for operations described herein. This includes memory element(s) 1304 and/or storage 1306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, compact disc (CD) read only memory (ROM) (CD-ROM), digital video disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., fourth generation (4G)/fifth generation (5G)/next generation (nG), IEEE 802.11 (e.g., Wi-Fi®/Wi-Fi6®), IEEE 802.15 (e.g. Wireless Personal Area Networks (WPAN)), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided that comprises receiving, by a network access device, a first network message from a wireless client device, the first network message identifying the wireless client device via a first source device address, obtaining, by the network access device, a first stable machine identifier (SMI) of the wireless client device, and transmitting, to an authentication service, a first mapping of the first source device address to the first SMI.

In another form, an apparatus is provided that comprises a network interface configured to enable network communications, one or more processors, and one or more memories storing instructions that when executed configure the one or more processors to perform operations comprising receiving, by a network access device, a first network message from a wireless client device, the first network message identifying the wireless client device via a first source device address, obtaining, by the network access device, a first stable machine identifier (SMI) of the wireless client device and transmitting, to an authentication service, a first mapping of the first source device address to the first SMI.

The methods presented herein may be embodied in a non-transitory computer readable storage medium comprising instructions that when executed configure one or more processors to perform the operations of the method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   receiving, by a network access device, a first network message from a wireless client device, the first network message identifying the wireless client device via a first source device address;
   transmitting, by the network access device and to an authentication service, an access-request message with a stable machine identifier (SMI) attribute having a null data value to request an SMI of the wireless client device;
   receiving, from the authentication service, a response to the access-request message;
   obtaining, by the network access device, a first SMI of the wireless client device based on receiving the response; and
   transmitting, to the authentication service, a first mapping of the first source device address to the first SMI.

2. The method of claim 1, further comprising generating another access-request message that includes another SMI attribute indicating the first SMI and a calling station identifier attribute indicating the first source device address, wherein transmitting the first mapping transmits the another access-request message.

3. The method of claim 1, further comprising:
   receiving, by the network access device, a second network message from the wireless client device, the second network message identifying the wireless client device via a second source device address; and
   transmitting, to the authentication service, and in response to the second network message, a second mapping of the second source device address to the first SMI.

4. The method of claim 1, further comprising:
   receiving, from the authentication service, a second mapping of the first source device address to a second SMI; and
   storing a mapping of the first SMI to the second SMI in response to the second mapping.

5. The method of claim 1, further comprising:
   providing a query to the authentication service for an SMI associated with the first source device address;
   receiving, from the authentication service, a response to the query that does not specify a SMI associated with the first source device address; and
   generating the first SMI based on the response to the query, wherein the obtaining is based on the generating.

6. The method of claim 5, wherein providing the query to the authentication service comprises transmitting the access-request message to the authentication service.

7. The method of claim 1, wherein the response includes an SMI associated with the first source device address.

8. An apparatus comprising:
   a network interface configured to enable network communications;
   one or more processors; and
   one or more memories storing instructions that when executed configure the one or more processors to perform operations comprising:

receiving a first network message from a wireless client device, the first network message identifying the wireless client device via a first source device address;

transmitting, to an authentication service, an access-request message with a stable machine identifier (SMI) attribute having a null data value to request an SMI of the wireless client device;

receiving, from the authentication service, a response to the access-request message;

obtaining a first SMI of the wireless client device based on receiving the response; and transmitting, to the authentication service, a first mapping of the first source device address to the first SMI.

9. The apparatus of claim 8, the operations further comprising generating another access-request message that includes another SMI attribute indicating the first SMI and a calling station identifier attribute indicating the first source device address, wherein transmitting the first mapping transmits the another access-request message.

10. The apparatus of claim 8, the operations further comprising:

receiving a second network message from the wireless client device, the second network message identifying the wireless client device via a second source device address; and transmitting, to the authentication service, and in response to the second network message, a second mapping of the second source device address to the first SMI.

11. The apparatus of claim 8, the operations further comprising:

receiving, from the authentication service, a second mapping of the first source device address to a second SMI; and storing a mapping of the first SMI to the second SMI in response to the second mapping.

12. The apparatus of claim 8, the operations further comprising:

providing a query to the authentication service for an SMI associated with the first source device address;

receiving, from the authentication service, a response to the query that does not specify an SMI associated with the first source device address; and generating the first SMI based on the response to the query, wherein the obtaining is based on the generating.

13. The apparatus of claim 12, wherein providing the query to the authentication service comprises transmitting the access-request message to the authentication service.

14. The apparatus of claim 13, wherein the response to the query is an access-accept message indicating an SMI attribute having a null data value.

15. The apparatus of claim 13, wherein the operations further comprise providing the first SMI to the wireless client device.

16. The apparatus of claim 9, wherein the response includes an SMI associated with the first source device address.

17. A non-transitory computer readable storage medium comprising instructions that when executed configure one or more processors to perform operations comprising:

receiving a first network message from a wireless client device, the first network message identifying the wireless client device via a first source device address;

transmitting, to an authentication service, an access-request message with a stable machine identifier (SMI) attribute having a null data value to request an SMI of the wireless client device;

receiving, from the authentication service, a response to the access-request message;

obtaining a first SMI of the wireless client device based on receiving the response; and transmitting, to the authentication service, a first mapping of the first source device address to the first SMI.

18. The non-transitory computer readable storage medium of claim 17, the operations further comprising generating another access-request message that includes another SMI attribute indicating the first SMI and a calling station identifier attribute indicating the first source device address, wherein transmitting the first mapping transmits the access-request message.

19. The non-transitory computer readable storage medium of claim 17, the operations further comprising:

receiving a second message from the wireless client device, the second message identifying the wireless client device via a second source device address; and transmitting, to the authentication service, and in response to the second message, a second mapping of the second source device address to the first SMI.

20. The non-transitory computer readable storage medium of claim 17, the operations further comprising:

receiving, from the authentication service, a second mapping of the first source device address to a second SMI; and storing a mapping of the first SMI to the second SMI in response to the second mapping.

* * * * *